United States Patent [19]
Petrille, III et al.

[11] Patent Number: 5,486,296
[45] Date of Patent: Jan. 23, 1996

[54] DETOXIFICATION FOR QUATERNARY AMMONIUM COMPOUNDS WITH LIGNOSULFONATES

[75] Inventors: Joseph C. Petrille, III, North Wales; Stephen R. Vasconcellos, Doylestown; Michael W. Werner, Warrington, all of Pa.

[73] Assignee: Betz Laboratories, Inc., Trevose, Pa.

[21] Appl. No.: 396,941

[22] Filed: Mar. 1, 1995

[51] Int. Cl.$^6$ .................................................. C02F 1/66
[52] U.S. Cl. ............................................ 210/749; 210/903
[58] Field of Search ........................................... 210/702, 729, 210/730, 749, 903

[56] References Cited

U.S. PATENT DOCUMENTS

| | | | |
|---|---|---|---|
| 3,407,188 | 10/1968 | Cavagna . | |
| 3,524,812 | 8/1970 | Shema et al. | 210/63 |
| 3,622,510 | 11/1971 | Felicetta . | |
| 3,857,830 | 12/1974 | Briggs . | |
| 4,204,054 | 5/1980 | Jacob | 210/59 |
| 4,812,240 | 3/1989 | Watts | 210/639 |
| 5,120,449 | 6/1992 | Guillerme et al. | 210/725 |
| 5,169,536 | 12/1992 | Vasconcellos et al. | 210/691 |

*Primary Examiner*—Neil McCarthy
*Attorney, Agent, or Firm*—Alexander D. Ricci; Steven D. Boyd

[57] ABSTRACT

Detoxification of quaternary ammonium compounds using detoxifying amounts of lignosulfonate.

6 Claims, No Drawings

DETOXIFICATION FOR QUATERNARY AMMONIUM COMPOUNDS WITH LIGNOSULFONATES

FIELD OF THE INVENTION

The present invention relates to detoxification of quaternary ammonium compounds with regards to aquatic organisms. More particularly, the present invention relates to a process which employs lignosulfonates to reduce the toxicity of quaternary ammonium compounds sufficiently to protect aquatic organisms.

BACKGROUND OF THE INVENTION

Quaternary ammonium compounds represent an important class of cationic surface-active agents which are used in a variety of commercial products. Quaternary ammonium compounds have a positively charged nitrogen atom and at least one hydrophobic long-chain substituent in the molecule. Quaternary ammonium compounds are exemplified by the structure:

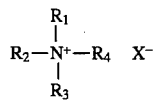

where $R_1$ is a substituted or unsubstituted alkyl or aryl group having about 6 to 24 carbons; $R_2$ is an alkyl, aryl or arylalkyl group having about 6 to 24 carbons; $R_3$ and $R_4$ represent alkyl groups having 1 to 4 carbons; and X represents an anion consisting of either a halide salt, sulfate, carbonate, acetate, and nitrate. Exemplary quaternary ammonium compounds are generally classified as monoalkyltrimethyl ammonium salts, monoalkyldimethylbenzyl ammonium salts, and dialkyldimethyl ammonium salts.

Quaternary ammonium compounds have an extremely strong affinity for negatively charged substrates. Their highly adsorptive properties make them suitable for a wide variety of commercial applications. For example, these compounds are utilized as fabric softeners, laundry detergents, anti-static sprays, flotation promoters for the mining industry, asphalt and petroleum additives, in the manufacturing of organo-modified clays (used in drilling muds). Other major uses include corrosion inhibitors and highly potent germicides/deodorizers, and biocides.

Through their intended uses, quaternary ammonium compounds ultimately end up in the aquatic environment. A majority of these compounds enter wastewater treatment facilities where they are removed or reduced by numerous mechanisms including adsorption, complexation and biodegradation to levels non-toxic to aquatic life upon their discharge to the environment. However, the uses of quaternary ammonium compounds as biocides particularly for controlling biological fouling or as corrosion inhibitors in industrial cooling water systems are often not sent to a wastewater treatment facility but are released directly to the aquatic environment. The discharge water streams from industrial cooling water systems and other aqueous systems treated by such quaternary ammonium based compounds may contain elevated residual amounts. Such releases may cause unacceptable shod-term or long-term impacts to aquatic life within the receiving stream. Aquatic life referred to herein includes microbiological organisms (i.e., bacteria, fungi, and algae), fish, planktonic and benthic macroinvertebrates, and zooplankton assemblages living within streams, rivers, lakes, reservoirs, estuaries, and oceans. Quaternary ammonium compounds may be acutely toxic to specific aquatic organisms at concentrations as low as 10 ug/L.

Concerns with respect to such discharge of quaternary ammonium compounds and other toxic waste products into the aquatic environment has grown significantly in recent years. This growing concern is manifested, in part, in the actions of municipal, state and federal environmental regulatory authorities who have either already enacted legislation to eliminate the pollution of our natural waters or who are in the process of promulgating such regulations. The regulations and legislation enacted by such authorities are becoming more and more stringent with the ultimate goal being the prohibition of the addition of any chemical compound into the aquatic environment which has even an insignificant effect on the aquatic life which exists therein.

In response to such legislation, industrial users of large volumes of water have sought out methods of decreasing effluent toxicity. For example, U.S. Pat. No. 3,524,812 teaches a method of decreasing the biocidal effects of bromonitrostyrene by reaction with a compound selected from a water soluble sulfite compound, hydrogen peroxide, and potassium permanganate. U.S. Pat. No. 4,204,954 teaches the use of anionic substances such as sodium stearate, sodium dodecylsulfate, dodecylglycine, dodecylaminoethylglycine, sodium palmitate, sodium oleate, sodium linoleate, and sodium dioctylsulfosuccinate to detoxify quaternary ammonium based biocides.

The addition of clays to water treated with quaternary ammonium based biocides prior to release into the environment is known. Such materials, particularly bentonite clays, have been shown in laboratory and field tests to be effective at detoxifying quaternary ammonium based biocides. While clays have been shown to be effective treatments for the detoxification of biocides, they are troublesome to feed. U.S. Pat. No. 5,169,536 teaches a method of detoxifying cationic surfactant based biocides with a combination of bentonite clay detoxification agent and a polymerized alkyl naphthalene sulfonate sodium salt dispersing agent. While clay based detoxification methods are effective, regulatory agencies have shown concern over the long term deposition and accumulation of inert clays and their environmental impact.

SUMMARY OF THE INVENTION

The present inventors discovered that lignosulfonates can neutralize the acute toxicity associated with quaternary ammonium compounds to aquatic organisms. The lignosulfonate detoxification agents of the present invention are effective in the absence of clay. While lignosulfonate materials have been employed as dispersants in combination with clay detoxifying agents, the detoxifying activity of such materials in the absence of clay is new and non-obvious.

DESCRIPTION OF THE PREFERRED EMBODIMENTS

The present inventors found that lignosulfonates are effective at neutralizing the toxicity of quaternary ammonium compounds toward aquatic organisms. The detoxifying ability of modified lignosulfonates were evaluated in numerous acute bioassays conducted in accordance with U.S. EPA testing guidelines. Aquatic toxicity test procedures using the water flea, *Daphnia magna*, and the fathead minnow, *Pimephales promelas*, as representative aquatic organisms were performed to assess the ability of lignosulfonates to detoxify quaternary ammonium compounds.

These test organisms were chosen because they are highly sensitive to quaternary ammonium compounds and their vital importance in the aquatic ecosystem.

Lignosulfonates are by-products derived from the sulfite-pulping and kraft-pulping processes of wood lignins. Lignosulfonates are used in a variety of general commercial applications including use as dispersants, binders, sequestrants, emulsifiers, and resin coreactants. Structurally, lignins consist of both nonrandom two-dimensional and random three-dimensional networks of polymers comprised of p-hydroxyphenylpropane monomers cross-linked together. Because lignins are a very complex amorphous natural polymers with many random couplings, the exact chemical structure is unknown. Lignosulfonates are non-linear, highly branched polymers which may contain a large number of phenolic, methoxyl, carboxyl, aliphatic, hydroxyl, and sulfonate functional groups. The predominate counterions are sodium, ammonium, calcium, magnesium, or potassium. The chemical and molecular characteristics of formulated lignosulfonates are determined by various chemical modification techniques including demethylation, oxidation, sulfomethylation, methylation, phenolation, and alkoxylation reactions. Modifications such as increasing the reaction time of the sulfonation process and/or the addition of excess sulfonic acid results in higher molecular weight crosslinked polymers with a higher percentage of sulfonated groups. Lignosulfonates typically possess the following properties: (1) Degree of sulfonation: 0.2 to 6.0, (2) pH range 8.0 to 12.0, (3) total percent sulfur: 2.0 to 14, (4) molecular weight: 5,000 to 100,000, (5) percent sulfonate sulfur: 2 to 9.5.

The preferred lignosulfonates have the following properties: (1) Degree of sulfonation: 0.2 to 3.0, (2) pH range 9 to11, (3) total percent sulfur: 2 to 6, (4) molecular weight: 10,000 to 50,000, (5) percent sulfonate sulfur: 2 to 5, and (6) monovalent metallic cations selected from: $Na^+$ or $K^+$.

The lignosulfonate compounds of the present invention are effective detoxifying agents at treatment ranges of from about 1 to greater than 150 mg/L lignosulfonate to every 1 mg/L of quaternary ammonium compound. Lignosulfonates which are encompassed by the present invention include commercially available lignosulfonate represented by several product series: Ufoxane, Marasperse, Dynasperse, Diwatex (available from LignoTech Corporation) and the Reax Series (available from Westvaco Corp.) were selected and shown to neutralize the toxicity associated with quaternary ammonium compounds.

The ability of lignosulfonate materials to neutralize the toxicity of quaternary ammonium based compounds toward aquatic organisms was evaluated in several acute bioassay studies. The following examples summarize the results.

EXAMPLE 1

The bioassay procedure was as follows: *Daphnia magna* neonates (less than 24 hours old) were exposed to 1.0 to 2.5 mg per liter of n-alkyl dimethylbenzyl ammonium chloride (ADBAC) combined with various concentrations of modified lignosulfonates ranging from 25 to 300 mg per liter. All test solutions were prepared in dechlorinated drinking water as the diluent. Twenty *Daphnia magna* neonates, ten individuals per replicate test beaker, were exposed to each test solution for 48 hours under static conditions. The toxicity tests were conducted in 250-ml glass beakers containing approximately 200 ml of test solution. The toxicity tests were performed at 20° C. and the test organisms were not fed during this period. Mortality observations were recorded at 24-hour intervals through the toxicity test. The toxicity tests were performed in accordance with U.S. Environmental Protection Agency toxicity testing guidelines.

A variety of lignosulfonates available commercially from LignoTech and Westvaco Corporation were tested for their ability to detoxify ADBAC toward *Daphnia magna*. Tables I-VI summarize the results.

TABLE I

Dynasperse LCD: *Daphnia magna*

| ADBAC (mg/L) | Dynasperse LCD (mg/L) | Treatment Ratio | 48-Hour Cumulative % Mortality |
|---|---|---|---|
| 2.5 | 0 | 2.5:0 | 100% |
| 2.5 | 100 | 1:40 | 80% |
| 2.5 | 150 | 1:60 | 5% |
| 2.5 | 200 | 1:80 | 0% |
| 2.5 | 300 | 1:120 | 0% |
| 0.0 | 0 | 0:0 | 0% |
| 0.0 | 300 | 0:300 | 0% |

TABLE II

Diwatex 40P : *Daphnia magna*

| ADBAC (mg/L) | Diwatex 40P (mg/L) | Treatment Ratio | 48-Hour Cumulative % Mortality |
|---|---|---|---|
| 1 | 0 | 1:0 | 100% |
| 1 | 40 | 1:40 | 100% |
| 1 | 60 | 1:60 | 100% |
| 1 | 80 | 1:80 | 65% |
| 1 | 100 | 1:100 | 15% |
| 1 | 120 | 1:120 | 0% |
| 0 | 0 | 0:0 | 0% |

TABLE III

Dynasperse B: *Daphnia magna*

| ADBAC (mg/L) | Dynasperse B (mg/L) | Treatment Ratio | 48-Hour Cumulative % Mortality |
|---|---|---|---|
| 1 | 40 | 1:40 | 100% |
| 1 | 60 | 1:60 | 90% |
| 1 | 80 | 1:80 | 60% |
| 1 | 100 | 1:100 | 5% |
| 1 | 120 | 1:120 | 0% |

TABLE IV

Marasperse BXP-1: *Daphnia magna*

| ADBAC (mg/L) | Marasperse BXP CBA-1 (mg/L) | Treatment Ratio | 48-Hour Cumulative % Mortality |
|---|---|---|---|
| 1 | 40 | 1:40 | 100% |
| 1 | 60 | 1:60 | 75% |
| 1 | 80 | 1:80 | 15% |
| 1 | 100 | 1:100 | 0% |
| 1 | 120 | 1:120 | 0% |

TABLE V

Ufoxane 2: *Daphnia magna*

| ADBAC (mg/L) | Ufoxane 2 (mg/L) | Treatment Ratio | 48-Hour Cumulative % Mortality |
|---|---|---|---|
| 1 | 60 | 1:60 | 100% |

TABLE V-continued

Ufoxane 2: *Daphnia magna*

| ADBAC (mg/L) | Ufoxane 2 (mg/L) | Treatment Ratio | 48-Hour Cumulative % Mortality |
|---|---|---|---|
| 1 | 80 | 1:80 | 90% |
| 1 | 100 | 1:100 | 10% |
| 1 | 120 | 1:120 | 0% |

TABLE VI

Reax 905: *Daphnia magna*

| ADBAC (mg/L) | Reax 905 (mg/L) | Treatment Ratio | 48-Hour Cumulative % Mortality |
|---|---|---|---|
| 1 | 40 | 1:40 | 100% |
| 1 | 60 | 1:60 | 70% |
| 1 | 80 | 1:80 | 40% |
| 1 | 100 | 1:100 | 10% |
| 1 | 120 | 1:120 | 5% |
| 0 | 0 | 1:0 | 0% |

EXAMPLE 2

A lignosulfonate available commercially from LignoTech Corporation under the trade name Dynasperse LCD was tested for its ability to detoxify didecyl dimethyl ammonium chloride (DDMAC) toward *Daphnia magna* in accordance with the above procedure. Table VII summarizes the results.

TABLE VII

Dynasperse LCD: *Daphnia magna*

| DDMAC (mg/L) | Dynasperse LCD (mg/L) | Treatment Ratio | 48-Hour Cumulative % Mortality |
|---|---|---|---|
| 1 | 0 | 1:0 | 100% |
| 1 | 20 | 1:20 | 55% |
| 1 | 40 | 1:40 | 5% |
| 0 | 0 | 0:0 | 0% |

EXAMPLE 3

A lignosulfonate available commercially from LignoTech Corporation under the trade name Dynasperse LCD was tested for its ability to detoxify hexadecyl trimethyl ammonium bromide (HTMAB) toward *Daphnia magna* in accordance with the above procedure. Table VIII summarizes the results.

TABLE VIII

Dynasperse LCD: *Daphnia magna*

| HTMAB (mg/L) | Dynasperse LCD (mg/L) | Treatment Ratio | 48-Hour Cumulative % Mortality |
|---|---|---|---|
| 1 | 0 | 1:0 | 100% |
| 1 | 20 | 1:20 | 30% |
| 1 | 40 | 1:40 | 0% |
| 0 | 0 | 0:0 | 0% |

EXAMPLE 4

A toxicity test using fathead minnows was undertaken. Young fathead minnows (less than 14 days old) were exposed to 2.5 mg/L of ADBAC in combination with varying levels of lignosulfonate sold under the trade name Dynasperse LCD by LignoTech Corporation. All test solutions were prepared in dechlorinated drinking water as the diluent. Twenty fish, ten individuals per replicate test beaker, were exposed to each test solution for 96 hours under static conditions. The toxicity tests were conducted in 400 ml glass beakers containing approximately 300 ml of test solution. The tests were performed at 20° C. and the test organisms were not fed during the period. Mortality observations were recorded at 24-hour intervals throughout the 96 hour test. Table IX summarizes the results.

TABLE IX

Dynasperse LCD: Fathead Minnow

| ADBAC (mg/L) | Dynasperse LCD (mg/L) | Treatment Ratio | 96-Hour Cumulative % Mortality |
|---|---|---|---|
| 2.5 | 0 | 2.5:0 | 100% |
| 2.5 | 6.25 | 1:2.5 | 100% |
| 2.5 | 12.5 | 1:5 | 65% |
| 2.5 | 18.75 | 1:7.5 | 5% |
| 2.5 | 25 | 1:10 | 0% |
| 2.5 | 37.5 | 0:15 | 0% |
| 0.0 | 0 | 0:0 | 0% |

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of detoxifying water containing quaternary ammonium compounds toxic to aquatic organisms comprising adding thereto an amount of a lignosulfonate sufficient to neutralize the toxicity of the quaternary ammonium compounds to aquatic organisms.

2. The method of claim 1 wherein said lignosulfonate is a lignosulfonate having (1) a degree of sulfonation from about 0.2 to 3.0; (2) a pH in an aqueous solution of from about 9 to 11; (3) a total percent sulfur of from about 2 to 6% wt. (4) molecular weight of from about 10,000 to 50,000; (5) monovalent metallic cations selected from the group $Na^+$ or $K^+$; and (6) a percent sulfonate sulfur of from about 2 to 5%.

3. The method of claim 1 wherein said lignosulfonate is added to said water in a weight ratio of lignosulfonate to quaternary ammonium compounds of from about 1 to 1 to about 150 to 1.

4. A method of neutralizing the toxic effects of quaternary ammonium compounds in aqueous solutions toward aquatic organisms which comprises adding thereto a sufficient quantity for the purpose of neutralizing the toxic effects of quaternary ammonium compounds to aquatic organisms of a lignosulfonate.

5. The method of claim 4 wherein said lignosulfonate is a lignosulfonate (1) a degree of sulfonation from about 0.2 to 3.0; (2) a pH in an aqueous solution of from about 9 to 11; (3) a total percent sulfur of from about 2 to 6% wt. (4) molecular weight of from about 10,000 to 50,000; (5) monovalent metallic cations selected from the group $Na^+$ or $K^+$; and (6) a percent sulfonate sulfur of from about 2 to 5%.

6. The method of claim 4 wherein said lignosulfonate is added to said water in a weight ratio of modified lignosulfonate to quaternary ammonium compounds of from about 1 to 1 to about 150 to 1.

* * * * *